(12) United States Patent
Potter

(10) Patent No.: US 8,939,224 B2
(45) Date of Patent: Jan. 27, 2015

(54) HOOF MEDICAL DEVICE AND METHOD

(71) Applicant: Charles Spencer Potter, Dakota, MN (US)

(72) Inventor: Charles Spencer Potter, Dakota, MN (US)

(*) Notice: Subject to any disclaimer, the term of this patent is extended or adjusted under 35 U.S.C. 154(b) by 0 days.

(21) Appl. No.: 13/826,088

(22) Filed: Mar. 14, 2013

(65) Prior Publication Data

US 2014/0130466 A1    May 15, 2014

Related U.S. Application Data

(60) Provisional application No. 61/726,886, filed on Nov. 15, 2012.

(51) Int. Cl.
*A01L 15/00*    (2006.01)

(52) U.S. Cl.
CPC .................................. *A01L 15/00* (2013.01)
USPC ............................. 168/45; 606/212

(58) Field of Classification Search
USPC ................. 168/19, 1, 2, 6, 7, 47, 45; 606/212
See application file for complete search history.

(56) References Cited

U.S. PATENT DOCUMENTS

| | | | | |
|---|---|---|---|---|
| 309,690 A * | 12/1884 | Carroll | ........................ | 606/212 |
| 376,441 A * | 1/1888 | Hughes | ........................ | 606/212 |
| 380,093 A * | 3/1888 | Cruice et al. | .................. | 606/212 |
| 408,080 A * | 7/1889 | Carroll | .......................... | 606/212 |
| 583,455 A * | 6/1897 | Bush | ............................ | 606/75 |
| 3,862,631 A * | 1/1975 | Austin | ........................... | 606/60 |
| 4,723,540 A * | 2/1988 | Gilmer, Jr. | ..................... | 606/75 |
| 5,626,610 A * | 5/1997 | Janke | ........................... | 606/212 |
| 6,571,881 B1 * | 6/2003 | Nolan | ............................ | 168/20 |
| 7,516,799 B2 * | 4/2009 | Puhl | ............................. | 168/45 |
| 7,533,733 B2 * | 5/2009 | Nolan | ............................ | 168/45 |
| 2007/0125556 A1 * | 6/2007 | Puhl | .............................. | 168/47 |

FOREIGN PATENT DOCUMENTS

DE          3409696 A1 *    9/1985    ............. A01L 15/00

OTHER PUBLICATIONS

Machine translation for DE 3409696.*

* cited by examiner

*Primary Examiner* — Son T Nguyen
(74) *Attorney, Agent, or Firm* — DunlapWeaver PLLC

(57) ABSTRACT

A hoof medical device comprises two attaching plates, two clamp bands, each clamp band attached to one of the two attaching plates, a band adjustor comprising a band adjustor screw and configured to connect and slidably adjust the two clamp bands relative to each other by rotating the band adjustor screw, a strap folded over at least one of the clamp bands so that the at least one of the clamp bands is movable within a fold of the strap, and a plurality of screws configured to attach the two attaching plates and the strap to a hoof of an animal.

6 Claims, 2 Drawing Sheets

HOOF MEDICAL DEVICE AND METHOD

REFERENCE TO RELATED APPLICATION

This application claims the benefit of U.S. Provisional Patent Application No. 61/726,886, filed Nov. 15, 2012, entitled "Metal band that is fastened to a hoof via screws and tightened to relieve pain and fix founder and other hoof ailments."

BACKGROUND OF THE INVENTION

The present invention relates to a hoof medical device and method. Hooved animals suffer from hoof pain due to many reasons. Laminitis is the most severe and often leads to animals being euthanized. Hammering shoes onto laminitic hooves is painful. Existing solutions cannot be tightened.

Existing solutions require horseshoes to be fastened to the hooves and do not force the hoof wall back to the bone. Existing solutions do not apply immediate pressure to the front of the hoof wall to relieve pain and reshape the hoof.

As can be seen, there is a need for solutions to these and other problems.

SUMMARY OF THE INVENTION

In one aspect of the present invention, a hoof medical device comprises: two attaching plates; two clamp bands, each clamp band attached to one of the two attaching plates; a band adjustor comprising a band adjustor screw and configured to connect and slidably adjust the two clamp bands relative to each other by rotating the band adjustor screw; a strap folded over at least one of the clamp bands so that the at least one of the clamp bands is movable within a fold of the strap; and a plurality of screws configured to attach the two attaching plates and the strap to a hoof of an animal.

In one aspect, the two attaching plates each comprises a plurality of attaching holes through which some of the screws may be inserted. In one aspect, the clamp bands are attached to the attaching plates by rivets.

In one aspect, a method of healing a hoof comprises: providing the hoof medical device as described; approximately centering the attaching plates on medial and lateral portions of the hoof; attaching the attaching plates to the hoof with some of the screws; attaching the strap to the hoof with at least one of the screws; and turning the band adjustor screw to provide tension in the two clamp bands. In one aspect, the method further comprises removing the hoof medical device from the hoof after a period of approximately six weeks.

These and other features, aspects and advantages of the present invention will become better understood with reference to the following drawings, description and claims.

DETAILED DESCRIPTION OF THE INVENTION

Figure 1:
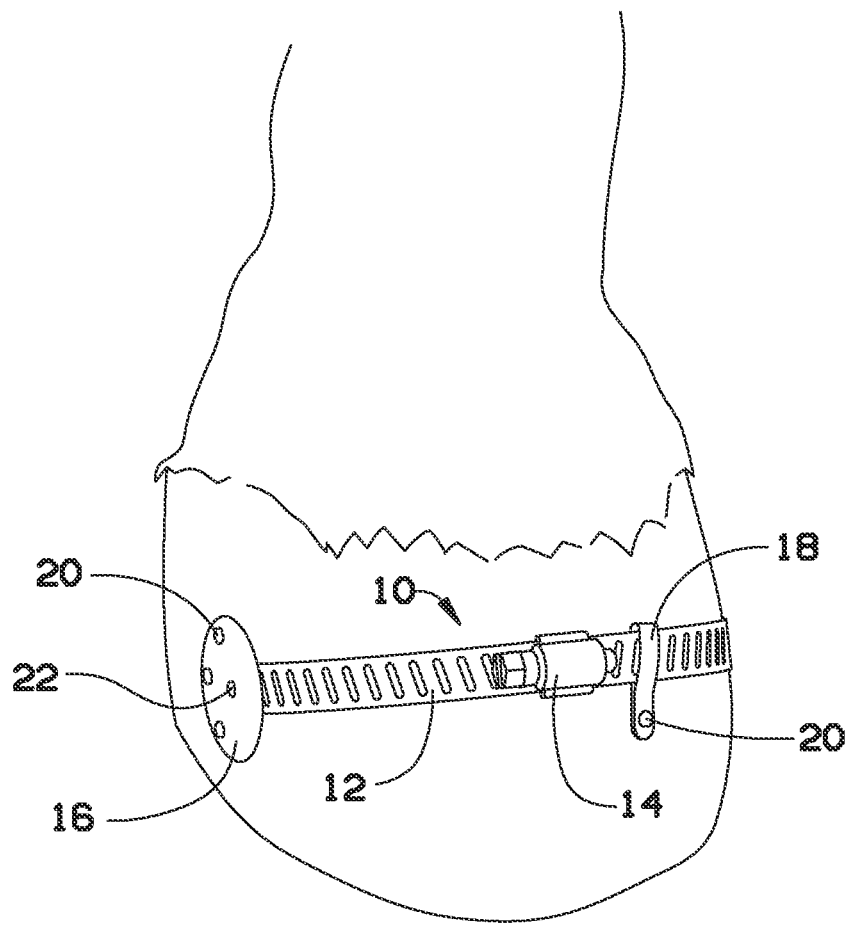
FIG. 1 shows a perspective view of the invention according to one embodiment.
Figure 2:
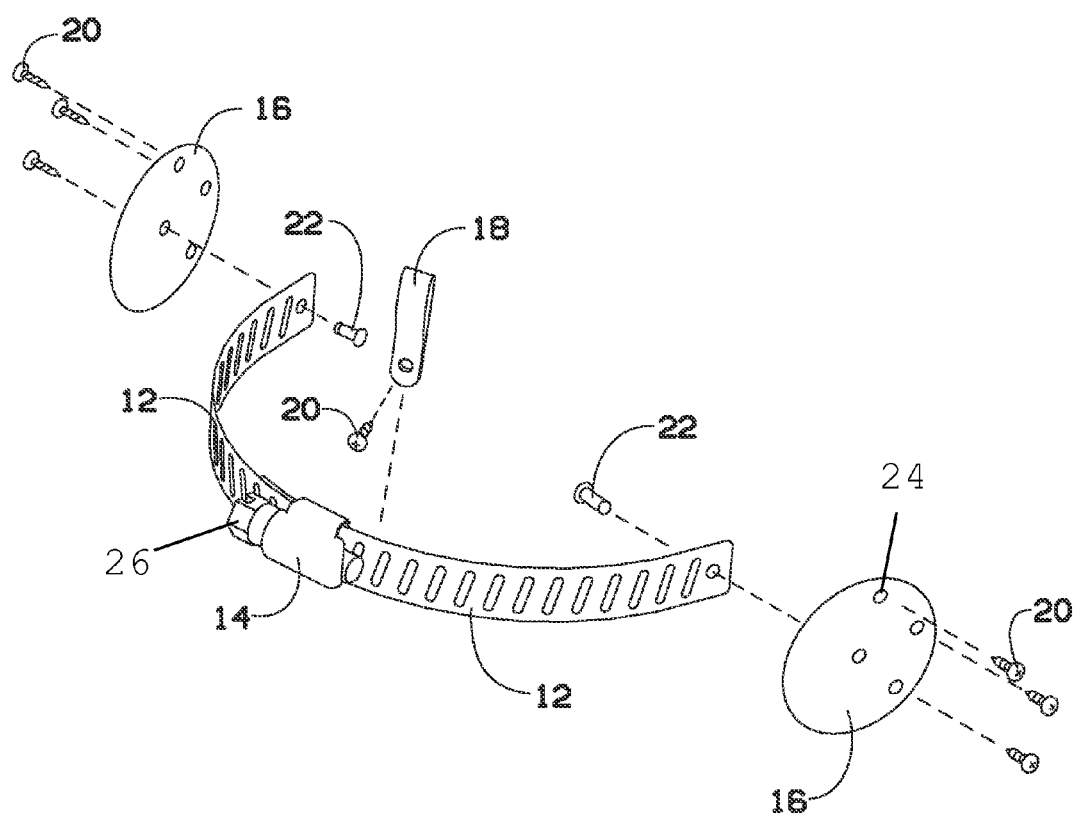
FIG. 2 shows an exploded view of the invention according to one embodiment.

The following detailed description is of the best currently contemplated modes of carrying out exemplary embodiments of the invention. The description is not to be taken in a limiting sense, but is made merely for the purpose of illustrating the general principles of the invention.

Referring now to the figures, the following reference numbers may refer to elements of the invention:

10: is the assembled hoof cinch or medical device
12: are the clamp bands
14: is the band adjustor
16: are the attaching plates
18: is the hold-down strap
20: are the screws
22: are the rivets
24: are the attaching holes
26: is the band adjustor screw One embodiment of the present invention includes a metal band that is fastened to a hoof via screws and tightened to relieve pain and fix founder and other hoof ailments. The hoof cinch according to one embodiment of the present invention requires no horseshoes and applies immediate pressure to the front of the hoof. The hoof cinch according to one embodiment of the present invention applies immediate pressure to the laminitic area of the hoof not only relieving pain but causing the hoof wall to grow back close to the rotated coffin bone. The hoof cinch according to one embodiment of the present invention is a pain-free application with no horseshoes required and pushes the hoof wall back to the coffin bone.

One version of the hoof cinch according to one embodiment of the present invention will be described here, without intent to limit the present invention. The hoof cinch 10 according to one embodiment of the present invention may include:

Two attaching plates 16 that may be made of any strong and/or rigid material, such as but not limited to 24 gauge steel or nickel, which may be approximately circular in shape but may have any other shape, such as rectangular. The attaching plates 16 may have several attaching holes 24, such as four. In terms of size, they may be between 0.5 and 3 inches, or between 1 and 2 inches, in diameter, depending on the hoof size and the user's needs.

An adjustable strip, such as a metal hose clamp cut in half, which may comprise two clamp bands 12 coupled together with a band adjustor 14 that engages the two clamp bands 12 and tightens them or loosens them depending on rotation of a band adjustor screw 26 in the band adjustor 14. The clamp bands may each be 1-4 inches in length, such as 2-3 inches in length, depending on hoof size and the user's needs.

A band (made of any strong material, such as but not limited to 24 gauge steel, plastic, etc.) with attaching holes in both ends, having a length of 2 to 3 inches, which may be folded to create hold-down strap 18.

Screws 20 or other attaching devices, such as ⅜ inch pan head, to attach attaching plates 16 to a hoof.

Rivets 22 or other attaching devices, such as ⅛ inch steel rivets, to attach clamp bands 12 to attaching plates 16.

Referring now to the figures, attaching plates 16 are attached to the clamp bands 12, that have attaching holes 24 punched in each end, via the rivets 22. The band (or bands, if one is used for each clamp band 12) may be folded in half over the clamp band 12 to form a hold-down strap 18 so that the clamp band 12 slides freely in the hold-down strap 18. The screws 20 may attach the attaching plates 16 to the medial and lateral sides of the hoof.

In one aspect of the present invention, the hoof cinch 10 is attached to the center of the medial and lateral areas of the animal with several (e.g., six) screws 20. The hold-down strap 18 is applied over the clamp band 12 in the toe area so it slides freely until it is attached to the hoof with a screw to hold the clamp band 12 in place. The band adjustor 14 may then be tightened with a screw driver by turning the band adjustor screw 26 until pressure is applied to the front of the hoof, to a desired pressure.

The attaching plates 16 may be centered on the medial and lateral portions of the hoof and then enough pressure applied to the front of the hoof via the band adjustor 14 and its corresponding clamp bands 12 to feel a slight movement in the hoof wall toe area.

In one aspect of use of the present invention, one need only to attach the hoof cinch 10 to the hoof as described, tighten, and wait several (e.g., three, six, or ten) weeks before removing.

In one aspect of the present invention, a hoof medical device 10 comprises: two attaching plates 16; two clamp bands 12, each clamp band 12 attached to one of the two attaching plates 16; a band adjustor 14 comprising a band adjustor screw 26 and configured to connect and slidably adjust the two clamp bands 12 relative to each other by rotating the band adjustor screw 26; a hold-down strap 18 folded over at least one of the clamp bands 12 so that the at least one of the clamp bands 12 is movable within a fold of the strap 18; and a plurality of screws 20 configured to attach the two attaching plates 16 and the strap 18 to a hoof of an animal.

The present invention is not limited to use of band adjustor 14 as shown; any other means of providing tension between clamp bands 12 is within the scope of the present invention. In one aspect, the two attaching plates 16 each comprises a plurality of attaching holes 24 through which some of the screws 20 may be inserted. In one aspect, the clamp bands 12 are attached to the attaching plates by rivets 22.

It should be understood, of course, that the foregoing relates to exemplary embodiments of the invention and that modifications may be made without departing from the spirit and scope of the invention.

What is claimed is:

1. A hoof medical device, comprising:
   two attaching plates;
   two clamp bands, each clamp band attached to one of the two attaching plates by an attachment device;
   a band adjustor connects the two clamp bands relative to each other and configured to adjust the two clamp bands relative to each other;
   a strap folded over at least one of the clamp bands so that the at least one of the clamp bands is movable within a fold of the strap; and
   a plurality of screws configured to attach the two attaching plates and the strap to a hoof of an animal.

2. The hoof medical device as claimed in claim 1, wherein the two attaching plates each comprises a plurality of attaching holes through which some of the screws may be inserted.

3. The hoof medical device as claimed in claim 1, wherein the clamp bands are attached to the attaching plates by rivets.

4. The hoof medical device as claimed in claim 1, wherein the band adjustor comprises a band adjustor screw, and wherein the band adjustor is configured to connect and slidably adjust the two clamp bands relative to each other by rotating the band adjustor screw.

5. A method of healing a hoof, comprising:
   providing the hoof medical device as claimed in claim 1;
   approximately centering the attached plates on medial and lateral portions of the hoof,
   attaching the attaching plates to the hoof with some of the screws;
   attaching the strap to the hoof with at least one of the screws; and
   turning the band adjustor screw to provide tension in the two clamp bands.

6. The method as claimed in claim 5, further comprising removing the hoof medical device from the hoof after a period of approximately six weeks.

\* \* \* \* \*